US005840820A

United States Patent [19]
DeSimone et al.

[11] Patent Number: 5,840,820
[45] Date of Patent: Nov. 24, 1998

[54] OLEFIN METATHESIS REACTIONS IN CARBON DIOXIDE MEDIUM

[75] Inventors: Joseph M. DeSimone, Chapel Hill; Chad D. Mistele, Carrboro, both of N.C.

[73] Assignee: The University of North Carolina at Chapel Hill, Chapel Hill, N.C.

[21] Appl. No.: 469,480

[22] Filed: Jun. 6, 1995

Related U.S. Application Data

[63] Continuation-in-part of Ser. No. 423,501, Apr. 13, 1995, abandoned.

[51] Int. Cl.$^6$ .............................. C07C 6/04; C07C 6/00
[52] U.S. Cl. .............................. 526/169; 526/89; 526/93; 526/115; 526/281; 526/250; 526/283; 526/941; 585/643; 585/646
[58] Field of Search .............................. 526/89, 281, 941, 526/93, 169, 250, 283; 585/643, 646

[56] References Cited

U.S. PATENT DOCUMENTS

| | | | |
|---|---|---|---|
| 2,963,447 | 12/1960 | Peters et al. | |
| 3,074,918 | 1/1963 | Sousa et al. | |
| 3,471,463 | 10/1969 | Kagiya et al. | |
| 3,880,945 | 4/1975 | Kramer | |
| 4,250,063 | 2/1981 | Kotani et al. | |
| 4,496,668 | 1/1985 | Newburg | 521/91 |
| 4,496,669 | 1/1985 | Leach | 521/93 |
| 4,568,660 | 2/1986 | Klosiewicz | 502/169 |
| 4,568,788 | 2/1986 | Kukes | 585/646 |
| 4,592,933 | 6/1986 | Meyerson et al. | 427/255.1 |
| 4,891,387 | 1/1990 | Janda | 521/54 |
| 4,959,395 | 9/1990 | Janda | 521/54 |
| 4,977,226 | 12/1990 | Sagawara et al. | 526/122 |
| 5,210,336 | 5/1993 | Gaffney | 568/860 |
| 5,312,882 | 5/1994 | DeSimone et al. | 526/201 |
| 5,312,940 | 5/1994 | Grubbs et al. | 556/136 |
| 5,328,972 | 7/1994 | Dada et al. | 526/227 |
| 5,342,909 | 8/1994 | Grubbs et al. | 526/171 |
| 5,376,744 | 12/1994 | Kennedy | 526/89 |
| 5,382,623 | 1/1995 | DeSimone et al. | 524/557 |
| 5,406,018 | 4/1995 | Sherman | 585/729 |

FOREIGN PATENT DOCUMENTS

| | | |
|---|---|---|
| WO93/20116 | 10/1993 | WIPO |
| WO95/03346 | 2/1995 | WIPO |
| WO96/01850 | 1/1996 | WIPO |
| WO96/10851 | 1/1996 | WIPO |

OTHER PUBLICATIONS

G. Odian, "Principles of Polymerization", (1991), 577, Wiley New York.

C.J. Hardiman of Monsanto (U.S. Pat. No. 5,266,665)(Abstract).

W. L. Truett et al.; *Polynorbornene by Coördination Polymerization*, 82:2337–2340 (May 5, 1960).

F. W. Michelotti et al.; Coordinated Polymerization of the Bicyclo[2.2.1]–heptene–2 Ring System (Norbornene) in Polar Media, *J. of Polymer Science: Part A*, 3:895–905 (1965).

K. J. Ivin; Olefin Metathesis, *Dept. of Chemistry, The Queen's University of Belfast*, Belfast, Northern Ireland (1983).

B. M. Novak et al.; Catalytic Organometallic Chemistry in Water: The Aqueous Ring–Opening Metathesis Polymerization of 7–Oxanorbornene Derivatives, *J. Am. Chem. Soc.*, 110:7543–7544 (1988).

R. Streck; Olefin Metathesis in Industry—A Status Report, *J. of Molecular Catalysis*, 46:305–316 (1988).

B. M. Novak et al.; The Ring Opening Metathesis Polymerization of 7–Oxabicyclo[2.2.1]–hept–5–ene Derivatives: A New Acyclic Polymeric Ionophore, *J. Am. Chem. Soc.*, 110:960–961 (1988).

R. H. Grubbs et al.; Polymer Synthesis and Organotransition Metal Chemistry, *Science*, 243:907–915 (1989).

W. J. Feast et al.; Aqueous ring–opening metathesis polymerizations of heteropolycyclic carboxylic acids with transition–metal chlorides, *Polymer*, 32:558–563 (1991).

Shui–Yu Lu et al.; Aqueous Ring–Opening Metathesis Polymerization of exo,exo–2,3–Bis(methoxymethyl)–7–oxanorbornene Catalyzed by Ruthenium Trichloride, *Macromolecules*, 25:2692–2697 (1992).

E. Zenkl et al.; The aqueous ring–opening metathesis polymerization of 7–oxa–norbornene–2,3–dicarboxylic acid dimethyl ester and norbornene with Ru catalysts, *J. of Molecular Catalysis*, 76:1–14 (1992).

M. B. France et al.; Initiation of Ring–Opening Metathesis Polymerization in Protic Media. Extension of $[Ru(H_2O)_6]^{2+}$ Catlyzed Polymerizations to Less–Strained Cyclic Monomers, *Macromolecules*, 26:4739–4741 (1993).

M. B. France et al.; Chain Transfer during the Aqueous Ring–Opening Metathesis Polymerization of 7–Oxanorbornene Derivatives, *Macromolecules*, 26:4742–4747 (1993).

V. C. Gibson; Metathesis Polymerization: ROMPing Towards New Materials, *Advanced Materials*, 6:37–42 (1994).

R. H. Grubbs; The Development of Functional Group Tolerant ROMP Catalysts, *J.M.S.—Pure Appl. Chem.*, A31(11):1829–1833 (1994).

C. D. Mistele et al.; The Ring–Opening Metathesis Polymerization of Norborene in Supercritical Carbon Dioxide, *Dept. of Chemistry, Univ. of North Carolina at Chapel Hill*, 507–508.

*Primary Examiner*—Fred Zitomer
*Attorney, Agent, or Firm*—Bell, Seltzer, Park & Gibson

[57] ABSTRACT

The present invention provides a process for olefin metathesis. The process comprises (a) providing a reaction mixture comprising an olefin, a metathesis initiator, and a reaction medium comprising carbon dioxide, and (b) reacting the reaction mixture to provide a metathesis modified olefin. The olefin metathesis reaction may be an olefin metathesis exchange reaction, an olefin metathesis degradation reaction, or a metathesis polymerization reaction. The carbon dioxide medium may be liquid, supercritical, and gaseous carbon dioxide.

20 Claims, No Drawings

5,840,820

OLEFIN METATHESIS REACTIONS IN CARBON DIOXIDE MEDIUM

This application is a continuation-in-part of U.S. patent application Ser. No. 08/423,501, filed 13 Apr. 1995 now abandoned.

FIELD OF THE INVENTION

The present invention relates to olefin metathesis reactions and particularly to olefin metathesis reactions carried out in a carbon dioxide medium.

BACKGROUND OF THE INVENTION

Generally, olefin metathesis reactions are reactions which involve the interchange of atoms between two molecules, and specifically refer to the interchange of carbon atoms between a pair of double bonds. The reactions are catalyzed by the generation of a carbene (divalent carbon) moiety at the point of reaction. Olefin metathesis reactions have been an area of active academic and industrial research. The commercial utility of olefin metathesis reactions which permit the modification and/or polymerization of olefins was readily recognized, even from the early publications discussing metathesis catalysts and reactions. For example, U.S. Pat. No. 2,963,447 to Peters et al. proposes metathesis catalysts and methods of preparing the same, which comprise contacting an oxide of a group 6a metal with a solution of a soluble hydrocarbon aluminum compound.

Olefin metathesis processes generally involve reacting a metathesis catalyst or initiator with an olefin either in bulk, or in the presence of solvent. For example, U.S. Pat. No. 3,074,918 to Eleuterio et al., proposes processes for the polymerization of cyclic olefins which include reacting the olefins with group VI-B metal oxide catalysts either in the presence of a hydrocarbon solvent, or in the absence of solvent. Typically, the solvents employed include hydrocarbon solvents, such as various volatile organic compounds. However, other solvents have also been attempted. For example, F. Michelotti, et al., *J. Polym. Sci.* 3:895 (1965) propose an olefin metathesis polymerization of norbornene in alcoholic solvents. W. Feast, et al., *Polymer* 32(3):558 (1991) propose a ring-opening metathesis polymerization of heteropolycyclic carboxylic acids in purely aqueous solvents. B. Novak, et al. *J. Am. Chem. Soc.* 110:960 (1988) propose a ring-opening metathesis polymerization of 7-oxanorbornene derivatives in water. E. Zenkl, et al., *J. Mol. Catalysis* 76:1 (1992) propose a ring-opening metathesis polymerization of norbornene and derivatives thereof in aqueous solvents as well. U.S. Pat. Nos. 5,312,940 and 5,342,909 to Grubbs et al. propose olefin metathesis polymerization catalysts useful for carrying out olefin metathesis reactions in organic, protic, or aqueous solvents. Recently, R. Grubbs has also reported a ring-opening polymerization in an aqueous emulsion with ruthenium based initiators and quaternary ammonium salts as surfactants. R. Grubbs, *ACS National Meeting, Anahiem, Calif.* (1995).

Accordingly, there remains a need in the art for solvent systems for olefin metathesis which are inexpensive, environmentally compatible and easily separable from product.

SUMMARY OF THE INVENTION

As a first aspect, the present invention provides a process for olefin metathesis. The process comprises (a) providing a reaction mixture comprising an olefin, a metathesis initiator, and a carbon dioxide reaction medium, and (b) reacting the olefin in the reaction medium to provide a metathesis modified olefin. As used herein, the phrase "metathesis modified olefin" refers to the products of a metathesis reaction, and specifically to olefins which have been modified in an olefin metathesis exchange reaction, or an olefin metathesis degradation reaction, or a polymer prepared according to a metathesis polymerization reaction. The carbon dioxide medium may be selected from the group consisting of liquid, supercritical, and gaseous carbon dioxide. The process is useful for producing metathesis modified olefins which are soluble in carbon dioxide and those which are insoluble in carbon dioxide.

As a second aspect, the present invention provides a process for olefin metathesis exchange. The process includes (a) providing a reaction mixture comprising an olefin, and a metathesis initiator, and a carbon dioxide reaction medium, and (b) reacting the olefin in the reaction medium to produce a metathesis modified olefin.

As a third aspect, the present invention provides a process for olefin metathesis degradation. The process includes (a) providing a reaction mixture comprising an olefin, and a metathesis initiator, and a reaction medium comprising carbon dioxide, and (b) reacting the olefin in the reaction medium to produce a metathesis modified olefin.

As a fourth aspect, the present invention provides a process for metathesis polymerization. The process includes (a) providing a polymerization reaction mixture comprising a monomer selected from the group consisting of olefins and alkynes, a metathesis initiator, and a carbon dioxide reaction medium, and (b) polymerizing the monomer to produce a polymer. As used herein, the term "polymer" refers to polymers of various molecular weight ranges and specifically includes low molecular weight oligomers. In one embodiment, the carbon dioxide reaction medium is present in an amount sufficient to act as a blowing agent and the polymer produced is a foamed polymer.

As a fifth aspect, the present invention provides a process for preparing a molded article. The process includes (a) providing a polymerization reaction mixture comprising a monomer selected from the group consisting of olefins and alkynes, a metathesis initiator, and a reaction medium comprising carbon dioxide, (b) injecting the polymerization reaction mixture into a mold; and (c) polymerizing the monomer to produce a polymer to form a molded article. According to one preferred embodiment, the carbon dioxide is present in an amount sufficient to act as a blowing agent.

As a sixth aspect the present invention provides a mixture useful for carrying out olefin metathesis reactions. The mixture includes an olefin, a metathesis initiator, and a reaction medium comprising carbon dioxide.

As an seventh aspect, the present invention provides a mixture produced by an olefin metathesis reaction. The mixture includes a metathesis modified olefin, and a reaction medium comprising carbon dioxide.

As a eighth aspect, the present invention provides a mixture useful as a reaction medium for olefin metathesis reactions. The mixture includes a metathesis initiator, and carbon dioxide.

Carbon dioxide has been employed as a reaction medium for the polymerization of various monomers. For example, U.S. Pat. No. 3,522,228 to Fukui et al., proposes the polymerization of vinyl monomers in liquid carbon dioxide using hydrocarbon polymerization initiators. U.S. Pat. No. 5,328,972 to Dada et al., proposes a process for preparing low molecular weight polymers in supercritical carbon dioxide. U.S. Pat. No. 3,471,463 to Kagiya et al., proposes the polymerization of ethylene in carbon dioxide, using a radical initiator compound. U.S. Pat. No. 5,312,882 and 5,382,623 to DeSimone et al., disclose the heterogeneous polymerization of water-insoluble polymers in carbon dioxide. PCT Publication No. WO 93/20116 to the University of North Carolina at Chapel Hill discloses processes for making fluoropolymers which include solubilizing a fluoromonomer in a solvent comprising carbon dioxide. The use of carbon dioxide in such systems is advantageous in that it provides an inexpensive solvent system, which is environmentally compatible, and easily separable from the polymers produced. However, none of the foregoing references discuss the use of carbon dioxide as a medium in olefin metathesis reactions.

The foregoing and other aspects of the present invention are explained in detail in the detailed description set forth below.

DETAILED DESCRIPTION OF THE INVENTION

As used herein, the term "olefin metathesis" has the conventional meaning in the art. See Ivin *Olefin Metathesis*, Academic Press, London (1983). Generally speaking, olefin metathesis refers to a reaction involving an interchange of carbon atoms between a pair of double bonds, or in the case of alkyne metathesis polymerization, between a pair of triple bonds. Olefin metathesis reactions can generally be classified into three primary types of reactions, exchange reactions, degradation reactions, and polymerization reactions. Olefin metathesis exchange reactions involve the exchange of carbon atoms across a pair of double bonds. Such reactions are useful for providing olefins or mixtures of olefins having more desirable molecular structure or molecular weight ranges. Olefin degradation reactions essentially involve a depolymerization process in which high molecular weight polymers are broken down into lower molecular weight fragments. Thus, exchange and degradation metathesis reactions provide a means of modifying olefins or mixtures of olefins to provide olefins or mixtures of olefins having more desirable molecular characteristics. Metathesis polymerization reactions typically involve the polymerization of olefins or alkynes. The most common metathesis polymerization reactions are ring-opening metathesis polymerizations of cyclic olefins. In such polymerizations, the metathesis initiator opens the olefin rings and tethers them together such that the resulting polymer exhibits ethylenic unsaturation along the backbone.

The olefin metathesis reactions may be carried out on a variety of olefins including cyclic, acyclic and polymeric olefins or mixtures thereof. In addition, olefin metathesis reactions may be carried out on olefins in combination with other unsaturated polymers. Suitable olefins include unsubstituted olefins and substituted olefins. Substituted olefins include olefins containing a variety of functional groups, such as for examples halogentated olefins, and particularly fluorinated olefins. Other suitable substituted olefins are known to those skilled in the art. Examples of suitable acyclic olefins include but are not limited to propene, ethylene, 1-butene, 2-butene, isobutene, 3,3 dimethylbut-1-ene, butadiene, isoprene. Examples of suitable cyclic olefins include but are not limited to cyclobutene, cyclopentene, cycloheptene, cyclooctene, cyclooctadiene, and derivatives thereof, including compounds which are substituted with up to four saturated or unsaturated hydrocarbyl, alkaryl, aralkyl or aryl groups in which "alkyl" or "alk" or "hydrocarbyl" may be linear, branched, or cyclic, and may contain up to 30 carbon atoms, up to sixty halogen atoms, and up to four heteroatoms selected form non-peroxidic O, N, and Si, which may be combined to form functional groups or linkages including ether, alcohol, ketone, aldehyde, carboxylic acid, ester, amide, amino, cyano, anhydride, and the like. Other suitable cyclic olefins include polycyclic mono- or diolefins such as norbornene and derivatives thereof, oxanorbornenes and derivatives thereof, norbornidienes and derivatives thereof, and dicyclopentadiene and derivatives thereof. Suitable "derivatives" include compounds optionally substituted with up to four saturated or unsaturated hydrocarbyl, alkaryl, aralkyl, or aryl groups in which "alkyl" or "alk" or "hydrocarbyl" may be linear, branched, or cyclic, and may contain up to 30 carbon atoms, up to sixty halogen atoms, and up to four heteroatoms selected form non-peroxidic O, N, and Si, which may be combined to form functional groups or linkages including ether, alcohol, ketone, aldehdyde, carboxylic acid, ester, amide, amino, cyano, anhydride, and the like. In the case of substituted norbornene and dicyclopentadiene, endo, exo, syn, anti or combinations of any of these isomers are suitable. Specific examples of suitable derivatives include 5-methyl-2-norbornene, 5-ethyl-2-norbornene, 7-methyl-2-norbornene, 1-methyl-2-norbornene, 5,6-dimethyl-2-norbornene, 5-norbornene-2-carbonitrile, 5-norbornene-2-carboxaldehyde, 5-norbornene-2,3-dicarboxylic acid, diethyl-5-norbornene-2,3-dicarboxylate, dimethyl-5-norbornene-2,3-dicarboxylate, 5-norbornene-2,3-dicarboxylic anhydride, 5-norbornene-2,2-dimethanol, 5-norbornene-2-methanol, 5-norbornen-2-ol, 2-acetyl-5-norbornene, 5-norbornen-2-yl acetate, 2-benzoyl-5-norbornene, 5-vinyl-2-norbornene, 5-methylene-2-norbornene, 5-norbornene-2-methanol acrylate, 5-[2-(trimethylsilyl-)ethyl]-2-norbornene, 5-[2-(pentamethyldisiloxy)ethyl]-2-norbornene, 5-chloromethyl-2-norbornene, 2,3-di(-chloromethyl)-5-norbornene, 5-trifluoromethyl-2-norbornene, and 2,3,3-trifluoro-2-trifluoromethyl-5-norbornene. Still other suitable derivatives of norbornene include Diels Alder adducts of cyclopentadiene or furan with a fluorinated olefin.

Examples of suitable fluorinated olefins include but are not limited to perfluoroisobutene, perfluorovinyl perfluoropropyl ether, 2-trifluoromethylperfluoropent-2-ene, 4-trifluoromethylperfluoropent-2-ene, hexafluorobut-2-yne, octafluorocyclopentene, 3,3,3-trifluoropropene, perfluoro-1-heptene, 1,2-bis(trifluoromethyl)acetylene, hexafluoropropene, perfluoro-2-butene, fluorinated oligomeric olefins, 1,1-dihydroperfluorooctyl acrylate, and 1,1,2,2-tetrahydroperfluorooctyl methacrylate, and the like.

As mentioned above, metathesis polymerizations may be carried out on monomers selected from any of the foregoing olefins, or mixtures thereof, and also on alkynes including cyclic and acyclic alkynes. For example, the process may be carried out on alkynes such as phenylacetylene, 3,3-dimethyl-1-butyne, o-trimethylsilylphenyl acetylene, cyclodecyne, cyclooctyne, and CH≡CCH$_2$XCH$_2$C≡CH wherein X is S, O or RSi and R is a linear or branched alkyl group such as for example, methyl, propyl, isopropyl, butyl, isobutyl, sec-butyl, and the like.

In addition, metathesis copolymerization reactions may be carried out by copolymerizing one or more monomers with any suitable comonomer. Suitable comonomers for metathesis copolymerization include but are not limited to those olefin and alkyne monomers recited above.

Copolymers which may be produced according to the processes of the present invention include but are not limited to poly(norbornene-co-dicyclopentadiene), poly(norbornene-co-7-oxanorbornene, 2,3-dimethoxy), poly (norbornene-co-5-norbornene 2,3 carboxylic acid, 1,1-dihydroperfluorooctyl ester), poly(norbornene-co-5-norbornene, 2,3 carboxylic acid anhydride), poly(7-oxanorbornene-co-5-norbornene, 2,3 carboxylic acid, 1,1-dihydroperfluorooctyl ester), and the like.

The olefin metathesis reactions of the present invention are carried out in the presence of a metathesis initiator. The metathesis initiators initiate the metathesis reaction, and may or may not be recovered at the completion of the reaction. The term "initiator" as used herein refers to both true initiators (i.e., wherein the initiator is not recoverable at the completion of the reaction) and metathesis catalysts (i.e., wherein the initiator is recoverable at the completion of the reaction). Metathesis initiators are well known in the art, and may be generally classified into three main categories; transition metal carbene metathesis initiators, transition metal salts in combination with an alkylating agent, and transition metal complexes capable of forming an active metal carbene by reaction with an olefin.

Transition metal carbene initiators include complexes which are prepared apart from the metathesis reaction process and which contain a metal carbene functionality. These complexes can be added to the reaction medium directly, and do not require an induction period. For example, transition metal carbene metathesis initiators include but are not limited to carbenes based on transition metals including ruthenium, molybdenum, tantalum, osmium, iridium, titanium, and tungsten carbenes. Suitable initiators are known to those skilled in the art, and include, for example, those described in R. H. Grubbs, et al., *Science* 243:907 (1989), and U.S. Pat. Nos. 5,312,940 and 5,342,909 to Grubbs et al., the disclosures of which are incorporated herein by reference in their entirety. Preferred transition metal carbenes include ruthenium carbenes, such as dichloro-3,3-diphenylvinylcarbene-bis(triphenylphosphine) ruthenium(II) [$(PPh_3)_2Cl_2Ru=CCH=CPh_2$], dichloro-3,3-diphenylvinylcarbene-bis(tri-isopropylphosphine) ruthenium(II) [$P(i-Pr)_3)_2Cl_2Ru=CHCH=CPh_2$], dichloro-1-phenylcarbene-bis(triphenylphosphine)ruthenium(II) [$(PPh_3)_2Cl_2Ru=C(H)Ph$], dichloro-1-phenylcarbene-bis(tricyclohexyl-phosphine)ruthenium(II) [$(PCy_3)_2Cl_2RU=C(H)Ph$].

An alternate metathesis initiator which is useful in the methods of the present invention is a multi-component system including a transition metal salt in combination with an alkylating agent, and optionally also an activator. Metathesis initiator systems of this type include, for example transition metal salts based on molybdenum, tungsten, titanium, zirconium, tantalum, and rhenium together with an alkylating agent, such as butyllithium, alkyl magnesium halides, alkyl aluminum halides, and alkyl or phenyl tin compounds. Typical transition metal salts include but are not limited to, $WCl_6$, $TiCl_4$, $TaCl_5$, $MoCl_5$, $Mo(CO)_6$, $W(CO)_6$, $Re_2O_7$, and $ReCl_5$. An activator may also be included to further facilitate the generation of the active carbene moiety. Examples of suitable activators which may also be incorporated into the initiator system include but are not limited to oxygen, alcohols such as methanol and ethanol, epoxides, hydroperoxide, and peroxides. Specific examples of suitable metathesis initiator systems of this type include but are not limited to, $WCl_6/Me_4Sn$, $WCl_6EtAlCl_2/EtOH$, $WCl_6/Ph_4Sn$, $WCl_6/Bu_4Sn/MeCN$, $WCl_6/Et_3SiH$, $WCl_6/Et_3Al$, (py)$_2MoCl_2(NO)_2/EtAlCl_2$, $ReCl_5/EtAlCl_2$, $ReCl_5/Et_3Al/O_2$, and $ReCl_5/Bu_4Sn$. A preferred metathesis initiator is $WCl_6/Ph_4Sn$.

Still other useful metathesis initiators include transition metal complexes capable of forming an active metal carbene by reaction with one or more of the olefins employed in the reaction. These transition metal complexes do not require the addition of an alkylating agent or an activator. Metathesis catalysts of this type include transition metal complexes of ruthenium, osmium, tungsten, and iridium. These complexes are known in the art, and include, for example the initiators described in W. J. Feast et al., *Polymer* 32(3):558 (1991), B. M. Novak, et al., *J. Am. Chem. Soc.* 110:7542 (1988), and S. Lu, et al., *Macromolecules* 25:2692 (1992), the disclosures of which are incorporated herein by reference in their entirety. Specific examples of metathesis initiators of this type include $Ru(H_2O)_6(tos)_2$, $RuCl_3$, $OsCl_3$, $RuCl_2(py)_2(PPh_3)_2$, $RuCl_2(PPh_3)_2$, $IrCl_3$, and $(NH_4)_2IrCl_6$. Preferred metathesis initiators include but are not limited to $Ru(H_2O)_6(tos)_2$, $RuCl_2(py)_2(PPH_3)_2$, $RUCl_2(PPh_3)_2$.

Any suitable metathesis initiator known to those skilled in the art may be employed in the olefin metathesis reactions of the present invention. The metathesis initiators may be heterogeneous, i.e., insoluble in the reaction medium or homogeneous, i.e., soluble in the reaction medium. The only requirement is that the metathesis initiator must be compatible with the reaction medium employed. In other words, the metathesis initiator must remain active in the reaction medium, such that the carbon dioxide does not deactivate the initiator and thus terminate the reaction.

The metathesis initiator may be added in neat form, as a solution in carbon dioxide, or it may conveniently be added as a solution in a cosolvent. The amount and type of metathesis initiator employed will depend upon the type of metathesis reaction to be carried out, the olefin or mixtures of olefins or alkynes employed, and the additional reaction conditions including pressure, temperature, cosolvent, and any surfactant or chain transfer agent employed. Generally, the amount of metathesis initiator employed will be sufficient to initiate and catalyze the given reaction. In the case of metathesis exchange reactions, the amount of the initiator will be sufficient to initiate and catalyze the exchange reaction to provide a metathesis modified olefin or mixture of olefins. In the case of a metathesis degradation reaction, the amount of initiator will be sufficient to initiate and catalyze the degradation reaction to depolymerize the olefin or mixture of olefins to provide a metathesis modified olefin or mixture of olefins. In the case of a metathesis polymerization reaction, the amount of initiator will be sufficient to initiate and catalyze the polymerization reaction to provide a polymer. Typically, the amount of metathesis initiator will be between about 0.01 and about 10 percent by weight, preferably between about 0.1 and about 5 percent by weight, more preferably between about 0.4 and about 0.8 percent by weight.

The olefin metathesis reactions of the present invention are carried out in a reaction medium comprising carbon dioxide. The carbon dioxide may be in a gaseous, liquid or supercritical state. As used herein, the term "supercritical" has its conventional meaning in the art. A supercritical fluid (SCF) is a substance above its critical temperature and critical pressure (or "critical point"). Compressing a gas normally causes a phase separation and the appearance of a separate liquid phase. However, if the fluid is in a supercritical state, compression will only result in density increases; no liquid phase will be formed.

The reaction medium may also include one or more cosolvents. Illustrative cosolvents include but are not limited to, tetrahydrofuran, toluene, alcohols, water, and the like. In the embodiment wherein the metathesis initiator is added as a solution in a cosolvent, the cosolvent should be capable of solubilizing the metathesis initiator such that the initiator may be provided to the reaction in the solubilized form.

The olefin metathesis reactions may include other additives and reactants known to those skilled in the art for controlling the physical or chemical properties of the resulting polymer. For example, in one preferred embodiment, the metathesis polymerization reaction includes a chain transfer agent capable of regulating the molecular weight of the resulting polymer. Suitable chain transfer agents will be readily known to those skilled in the art and include, for example, acyclic olefins such as 1-propene, 1-butene, 1-pentene, 1-hexene, and 3-hexene and diols such as 2-butene diol, and derivatives thereof.

In another preferred embodiment, the metathesis polymerization reaction includes a surfactant. Surfactants may be added to stabilize the monomer, formed polymer, or initiator. Ideally, one could form a colloidal system whcih would lead to a fine, easily processable powder after venting. The surfactant is an amphiphilic molecule which has an affinity for the reaction medium and the monomer or polymer. It typically acts to lower the surface tension between the polymer and medium. Suitable surfactants are well known to those skilled in the art. Specific examples of suitable surfactants are described in U.S. Pat. No. 4,592,933 the disclosure of which is incorporated herein by reference in its entirety.

The olefin metathesis reactions may be carried out at a temperature of about −57° C. up to about 300° C., and is typically carried out at a temperature of between about 0° C. and about 200° C. The reactions may be carried out at pressures ranging from about 10 psi to about 30,000 psi, and is typically carried out at a pressure of between about 50 psi and about 5,000 psi.

The reactions may be carried out batchwise or continuously in any appropriately designed high pressure reaction vessel. Advantageously, the reaction vessel may also be equipped with heating means such as an electric heating furnace to heat the reaction mixture to the desired temperature, and mixing means such as various stirrers including paddle stirrers, impeller stirrers, or multistage impulse countercurrent agitators, blades, and the like. The reaction vessel may also include a cooling means for cooling the reaction. In one preferred embodiment the reaction is carried out in a reaction injection mold.

The olefin metathesis reactions are carried out by reacting one or more olefins with the metathesis initiator in the reaction medium. More specifically, the olefin metathesis exchange reactions according to the present invention may be carried out by individually or concomitantly feeding the olefin to be reacted and the reaction medium into the reaction vessel containing the metathesis initiator. The reaction vessel is closed and the reaction mixture is brought to the desired reaction temperature and pressure. Alternatively, only part of the reaction mixture may be introduced into an autoclave and brought to the desired reaction temperature and pressure, with additional reaction mixture being pumped in at a rate corresponding to the rate of reaction. According to an alternate procedure, some of the olefin is initially taken into the autoclave in the total amount of carbon dioxide and the remaining olefin is pumped into the autoclave together with the initiator at the rate at which the reaction proceeds.

The olefin metathesis degradation reactions according to the present invention may be carried out in the same manner as outlined above for the olefin metathesis exchange reactions.

When the olefin metathesis exchange or degradation reaction is complete, the metathesis modified olefin may be separated from the reaction mixture. Any suitable means of separating the product from the reaction mixture may be employed. Typically, according to the process of the present invention, the metathesis modified olefin is separated from the reaction mixture by venting the reaction medium to the atmosphere. Thereafter, the metathesis modified olefin may be collected by physical isolation.

The metathesis modified olefins produced according to the methods of the present invention may be useful as monomers in polymerization reactions or as starting materials for the production of surfactants such as soaps and detergents.

The metathesis polymerization reactions according to the present invention may be carried out by providing a polymerization reaction mixture including monomer, metathesis initiator, and reaction medium, and polymerizing the monomer in the reaction medium to form a polymer. Typically, the polymerization is carried out by feeding a mixture of monomer, or monomer and comonomer, and reaction medium into a reaction vessel containing the metathesis initiator. The reaction vessel is closed and the reaction mixture is brought to the polymerization temperature and pressure. Alternatively, only a part of the reaction mixture may be introduced into an autoclave and heated to the polymerization temperature and pressure, with additional reaction mixture being pumped in at a rate corresponding to the rate of polymerization. In another possible procedure, some of the monomers are initially taken into the autoclave in the total amount of reaction medium and the remaining monomers or comonomers are pumped into the autoclave together with the initiator at the rate at which polymerization proceeds.

When the metathesis polymerization reaction is complete, the polymer may be separated from the reaction mixture. Any suitable means of separating the polymer from the reaction mixture may be employed. Typically, according to the process of the present invention, the polymer is separated from the reaction mixture by venting the reaction medium to the atmosphere. Thereafter, the polymer may be collected by physical isolation.

The polymers produced according to the methods of the present invention may be useful as thermoplastics, elastomers, foams, fillers, organic absorbers, conductors, metal complexing agents, telechelics, sound absorbers, shock dampeners, seals, gaskets, and the like.

The methods of the present invention may also be used to produce foamed polymers. According to one embodiment, the process includes (a) providing a polymerization reaction mixture comprising a monomer, or monomer and comonomer, metathesis initiator, and a carbon dioxide reaction medium, wherein the carbon dioxide is present in an amount sufficient to act as a blowing agent, and (b) polymerizing the monomer, or monomer and comonomer, to form a foamed polymer. The process may be carried out using conventional foaming techniques, such as those described in U.S. Pat. Nos. 4,891,387 and 4,959,395 to Janda, the disclosures of which are incorporated herein by reference in their entirety. Additional agents, such as surfactants, may also be added, particularly to slow the release of gas from the foaming polymer. The foamed polymer produced according to the methods of the present invention may be useful in areas where conventional foamed polymers are employed. For example, the foamed polymers of the present invention may be useful as insulation material, cushions, fillers, and the like.

The present invention also provides methods of processing the polymers produced according to the metathesis polymerization processes described above. For example, the present invention provides a process for preparing a molded article using the polymers prepared according to the metathesis polymerization methods of the present invention. According to one method, the molded article is prepared according to reaction injection molding techniques. According to one embodiment, the process includes (a) providing a polymerization reaction mixture comprising a monomer, or monomer and comonomer, metathesis initiator, and carbon dioxide reaction medium, (b) injecting the polymerization reaction mixture into a mold; and (c) polymerizing the monomer, or monomer and comonomer, to produce a polymer to form a molded article. The process may be carried out using conventional injection molding techniques, such as those described in U.S. Pat. No. 4,496,669 to Leach, and U.S. Pat. Nos. 4,891,387 and 4,959,395 to Janda, the disclosures of which are incorporated herein by reference in their entirety. The process may further comprise the addition of one or more blowing agents. Suitable blowing agents which are known in the art include hydrocarbons such as ethane, ethylene, propane, propene, butane, isobutane, neopentene, acetylene, hexane, and heptane; halocarbons such as chlorofluorocarbons and hydrofluorocarbons; and tetraalkyl silanes. Advantageously, the blowing agent may also be carbon dioxide. According to one preferred embodiment, the carbon dioxide reaction medium is present in an amount sufficient to act as a blowing agent.

The molded articles produced according to the present invention may include a variety of conventional articles such as for example, bath tubs, automotive body parts, golf carts and the like.

The following examples are provided to illustrate the present invention, and should not be construed as limiting thereof. In these examples, "ONDM" means 7-oxabicyclo[2.2.1]hept-5-ene,2,3-dimethoxy, "NORFOA" means bicyclo[2.2.1]hept-5-ene 2-carboxylic acid, 1,1,dihydroperfluorooctyl ester, "RuCl" means Ruthenium trichloride, "$Ru(H_2O)_6(tos)_2$ means ruthenium (II) hexaqua ditoluenesulfonate, "psi" means pounds per square inch; "g" means grams; "mg" means milligrams; "mL" means milliliters; "min." means minutes; and "° C." means degrees celsius, "K" means $1 \times 10^3$ mg/mol, Mn means number average molecular weight, Molecular weight is estimated using the method described in T. Suwa, et al., *J. Applied Polymer Sci.* 17:3253 (1973). The high pressure reactor was constructed from stainless steel having 1 cm thick sapphire windows sealed with a Teflon O-ring on the high pressure side, and having a volume of 25 mL and a pressure capacity of up to about 8000 psi.

EXAMPLE 1

Polymerization of ONDM

The polymerization of ONDM in a carbon dioxide/water medium with a $RuCl_3$ initiator is carried out by dissolving 0.014 g of $RuCl_3$ and 1.0 mL of ONDM in 6.0 mL of water. The solution is degassed and added to the high pressure cell after removing 1 mL for use as a control. Carbon dioxide is added and the cell is heated to 55° C. to achieve a final reaction pressure of 1500 psi. After 20 min. the cell is cooled, vented and the polymer is isolated in 11% yield. The Mn is 91.8K and the Molecular Weight Distribution is 1.8.

EXAMPLE 2

Polymerization of ONDM

The polymerization of ONDM in a carbon dioxide/water medium with $Ru(H_2O)_6(tos)_2$ is carried out by degassing 6.12 mg of $Ru(H_2O)_6(tos)_2$ dissolved in 2.5 mL of water and adding the solution to the high pressure cell. ONDM (0.427 g) is then added simultaneously with carbon dioxide by putting the ONDM in an injector loop and adding carbon dioxide through the loop. The cell is then heated to 50° C. to achieve a final reaction pressure of 2000 psi. After 20 min. the cell is cooled, vented, and the polymer is isolated in a 64% yield. The polymer is insoluble in THF.

EXAMPLE 3

Polymerization of ONDM

The polymerization of ONDM in carbon dioxide/methanol medium with $Ru(H_2O)_6(tos)_2$ is carried out by degassing a solution of 33 mg of $Ru(H_2O)_6(tos)_2$ in 1.0 mL of methanol. The solution is added to a preheated cell (50° C.) via cannula and carbon dioxide is added immediately after to 2000 psi. ONDM (0.50 g) is then added through an injector loop with more carbon dioxide to achieve a final reaction pressure of 3000 psi. After 3.25 hours, the cell is cooled, vented, and the polymer is isolated in a 34% yield. The polymer is insoluble in THF.

EXAMPLE 4

Polymerization of Norbornene

The polymerization of norbornene in carbon dioxide with $Ru(H_2O)_6(tos)_2$ is carried out by adding 150 mg of $Ru(H_2O)_6(tos)_2$ and 5.0 g of norbornene to a high pressure cell and purging with argon. Carbon dioxide is then added, and the cell is heated to 65° C. to achieve a final reaction pressure f 990 psi. After 16 hours, the cell is cooled, vented and the polymer is isolated in a 70% yield after dissolution in THF and precipitation into methanol containing 1% KOH. The Mn of the resulting polymer is 392K and the Molecular Weight Distribution is 3.3.

EXAMPLE 5

Polymerization of Norbornene

The polymerization of norbornene is carried out as described above in Example 4, except that the final reaction pressure is 1400 psi. The resulting polymer yield is 48%. Mn is 511K and the Molecular Weight Distribution is 2.0.

EXAMPLE 6

Polymerization of Norbornene

The polymerization of norbornene is carried out as described above in Example 4, except that the final reaction pressure is 1560 psi. The resulting polymer yield is 48%. Mn is 335K and the Molecular Weight Distribution is 2.6.

EXAMPLE 7

Polymerization of Norbornene

The polymerization of norbornene is carried out as described above in Example 4, except that the final reaction pressure is 2050 psi. The resulting polymer yield is 31%. Mn is 14.5K and the Molecular Weight Distribution is 2.4.

EXAMPLE 8

Polymerization of Norbornene

The polymerization of norbornene is carried out as described above in Example 4, except that the final reaction pressure is 2250 psi. The resulting polymer yield is 76%. Mn is 71.1K and the Molecular Weight Distribution is 2.2.

EXAMPLE 9

Polymerization of Norbornene

The polymerization of norbornene is carried out as described above in Example 4, except that the final reaction pressure is 2560 psi. The resulting polymer yield is 67%. Mn is 101K and the Molecular Weight Distribution is 2.5.

EXAMPLE 10

Polymerization of Norbornene

The polymerization of norbornene is carried out as described above in Example 4, except that the final reaction pressure is 3000 psi. The resulting polymer yield is 67%. Mn is 31.6K and the Molecular Weight Distribution is 2.0.

EXAMPLE 11

Polymerization of Norbornene

The polymerization of norbornene is carried out as described above in Example 4, except that the final reaction pressure is 3470 psi. The resulting polymer yield is 70%. Mn is 43.5K and the Molecular Weight Distribution is 2.2.

EXAMPLE 12

Polymerization of Norbornene

The polymerization of norbornene is carried out as described above in Example 4, except that the final reaction pressure is 4350 psi. The resulting polymer yield is 65%. Mn is 162K and the Molecular Weight Distribution is 3.6.

EXAMPLE 13

Polymerization of Norbornene

The polymerization of norbornene is carried out as described above in Example 4, except that the final reaction pressure is 5000 psi. The resulting polymer yield is 62%. Mn is 311K and the Molecular Weight Distribution is 2.7.

EXAMPLE 14

Polymerization of Norbornene in Carbon Dioxide/Methanol

The polymerization of norbornene in carbon dioxide/methanol with $Ru(H_2O)_6(tos)_2$ is carried out by adding 150 mg of $Ru(H_2O)_6(tos)_2$ and 5.0 g of norbornene to a high pressure cell with an argon purge followed by addition of 0.022 mL of degassed methanol via syringe or cannula. Carbon dioxide is then added, and the cell is heated to 65° C. to achieve a final reaction pressure of 5000 psi. After 5 hours, the cell is cooled, vented, and the polymer is isolated in an 8% yield after dissolution in THF and precipitation into methanol with 1% KOH. The Mn for the polymer is 39.0K and the Molecular Weight Distribution is 2.1. The cis-vinylene content is determined to be 83% by $^1H$ NMR Spectroscopy.

EXAMPLE 15

Polymerization of Norbornene in Carbon Dioxide/Methanol

The polymerization is carried out as described in Example 14, except that the amount of methanol added is 0.1 mL. The polymer yield is 16%. The Mn is 22.2K and the Molecular Weight Distribution is 2.0. The cis-vinylene content is determined to be 87% by $^1H$ NMR Spectroscopy.

EXAMPLE 16

Polymerization of Norbornene in Carbon Dioxide/Methanol

The polymerization is carried out as described in Example 14, except that the amount of methanol added is 0.2 mL. The polymer yield is 5%. The cis-vinylene content is determined to be 65% by $^1H$ NMR Spectroscopy.

EXAMPLE 17

Polymerization of Norbornene in Carbon Dioxide/Methanol

The polymerization is carried out as described in Example 14, except that the amount of methanol added is 0.3 mL. The polymer yield is 26%. The Mn is 54.5K and the Molecular Weight Distribution is 3.4. The cis-vinylene content is determined to be 37% by $^1H$ NMR Spectroscopy.

EXAMPLE 18

Polymerization of Norbornene in Carbon Dioxide/Methanol

The polymerization is carried out as described in Example 14, except that the amount of methanol added is 0.5 mL. The polymer yield is 29%. The Mn is 57.6K and the Molecular Weight Distribution is 3.7. The cis-vinylene content is determined to be 32% by $^1H$ NMR Spectroscopy.

EXAMPLE 19

Polymerization of Norbornene in Carbon Dioxide/Methanol

The polymerization is carried out as described in Example 14, except that the amount of methanol added is 1.0 mL. The polymer yield is 52%. The Mn is 85.8K and the Molecular Weight Distribution is 4.5. The cis-vinylene content is determined to be 31% by $^1H$ NMR Spectroscopy.

EXAMPLE 20

Polymerization of Norbornene in Carbon Dioxide/Methanol

The polymerization is carried out as described in Example 14, except that the amount of methanol added is 2.0 mL. The polymer yield is 49%. The Mn is 30.4K and the Molecular Weight Distribution is 4.1. The cis-vinylene content is determined to be 29% by $^1H$ NMR Spectroscopy.

EXAMPLE 21

Polymerization of Norbornene in Carbon Dioxide/Methanol

The polymerization is carried out as described in Example 14, except that the amount of methanol added is 4.0 mL. The polymer yield is 72%. The Mn is 112K and the Molecular Weight Distribution is 2.6. The cis-vinylene content is determined to be 28% by $^1H$ NMR Spectroscopy.

EXAMPLE 22

Polymerization of Norbornene in Carbon Dioxide/Methanol

The polymerization is carried out as described in Example 14, except that the amount of methanol added is 5.0 mL. The polymer yield is 70%. The Mn is 43.5K and the Molecular Weight Distribution is 3.0. The cis-vinylene content is determined to be 33% by $^1$H NMR Spectroscopy.

EXAMPLE 23

Polymerization of NORFOA in Carbon Dioxide/ Methanol

The polymerization of NORFOA in carbon dioxide/ methanol is carried out by adding 1.38 g of degassed NORFOA and 40 mg of Ru(H$_2$O)$_6$(tos)$_2$ to a 2.5 mL high pressure cell and purging with argon. Methanol (0.50 mL, degassed) is then added to the cell via cannula or syringe. Carbon dioxide is added, and the cell is heated to 65° C. After 7 hours, the cell is cooled, vented, and the polymer isolated in a 42% yield after dissolution into trifluorotoluene and precipitation into methanol.

EXAMPLE 24

Polymerization of NORFOA in Carbon Dioxide/ Methanol

The polymerization is carried out as described in Example 23, except that the reaction time is 16.5 hours. The polymer yield is 20%.

EXAMPLE 25

Polymerization of Norbornene in Carbon Dioxide with a Surfactant

The polymerization is carried out as described in Example 13, except that 100 mg of Zonyl™ BAN Fluoro alchol is added. The polymer yield is 8%.

EXAMPLE 26

Polymerization of Norbornene in Carbon Dioxide/ Chlorobenzene with WCl$_6$/Ph$_4$Sn The polymerization of norbornene with WCl$_6$/Ph$_4$Sn is carried out by adding 42 mg of WCl$_6$ and 90 mg of Ph$_4$Sn to a high pressure cell under argon. The cell is sealed, and 1.6 mL of chlorobenzene is added. The solution is allowed to mix for 1–2 minutes, then 2.0 g of norbornene dissolved in 0.8 mL of chlorobenzene is injected via carbon dioxide backpressure into the cell to 800 psi at room temperature. The mixture is allowed to react for 8 hours before it is terminated by injection of 1.5 mL of methanol. The polymer is isolated in a 25% yield after venting, washing with methanol, dissolution in tetrahydrofuran, precipitation into methanol, and drying.

The foregoing is illustrative of the present invention and is not to be construed as limiting thereof. The invention is defined by the following claims, with equivalents of the claims to be included therein.

That which is claimed is:

1. A process for carrying out an olefin metathesis reaction to produce a metathesis modified olefin, comprising:

(a) providing a reaction mixture comprising an olefin and a metathesis initiator in a carbon dioxide reaction medium wherein said olefin is solubilized in said carbon dioxide reaction medium, and (b) reacting said olefin with said initiator in said reaction medium to produce said metathesis modified olefin.

2. The process according to claim 1, wherein said olefin metathesis reaction is selected from the group consisting of a metathesis exchange reactions and a metathesis degradation reactions.

3. The process according to claim 1, wherein said reaction medium comprises liquid carbon dioxide.

4. The process according to claim 1, wherein said reaction medium comprises supercritical carbon dioxide.

5. The process according to claim 1, wherein said reaction medium comprises gaseous carbon dioxide.

6. The process according to claim 1, wherein said olefin is selected from the group consisting of cyclic, acyclic, and polymeric olefins.

7. The process according to claim 1, wherein said olefin is selected from the group consisting of norbornene.

8. The process according to claim 1, wherein said olefin is a fluorinated olefin.

9. The process according to claim 1, wherein said reaction mixture further comprises a second olefin.

10. The process according to claim 1, wherein said metathesis initiator comprises a transition metal carbene.

11. The process according to claim 10, wherein said transition metal carbene is a ruthenium carbene.

12. The process according to claim 1, wherein said metathesis initiator comprises a transition metal salt and an alkylating agent.

13. The process according to claim 12, wherein said transition metal salt is a tungsten salt, and said alkylating agent is selected from the group consisting of alkyl aluminum halides, and alkyl tins.

14. The process according to claim 1 wherein said metathesis initiator comprises a transition metal complex which forms an active metal carbene by reaction with said olefin.

15. The process according to claim 14, wherein said transition metal complex which forms an active metal carbene is a ruthenium complex.

16. The process according to claim 1, wherein said reaction medium further comprises a cosolvent.

17. The process according to claim 16, wherein said cosolvent is selected from the group consisting of tetrahydrofuran, toluene, alcohol, and water.

18. The process according to claim 1, further comprising the step of isolating said metathesis modified olefin.

19. The process according to claim 18, wherein said step of isolating said metathesis modified olefin comprises venting said reaction medium to the atmosphere.

20. The process according to claim 1, wherein said olefin metathesis reaction is a metathesis exchange reaction.

* * * * *